Jan. 24, 1950  R. STAHL  2,495,355
FOCUSING MECHANISM FOR TWIN LENS REFLEX CAMERAS
Filed Aug. 30, 1946  2 Sheets-Sheet 1
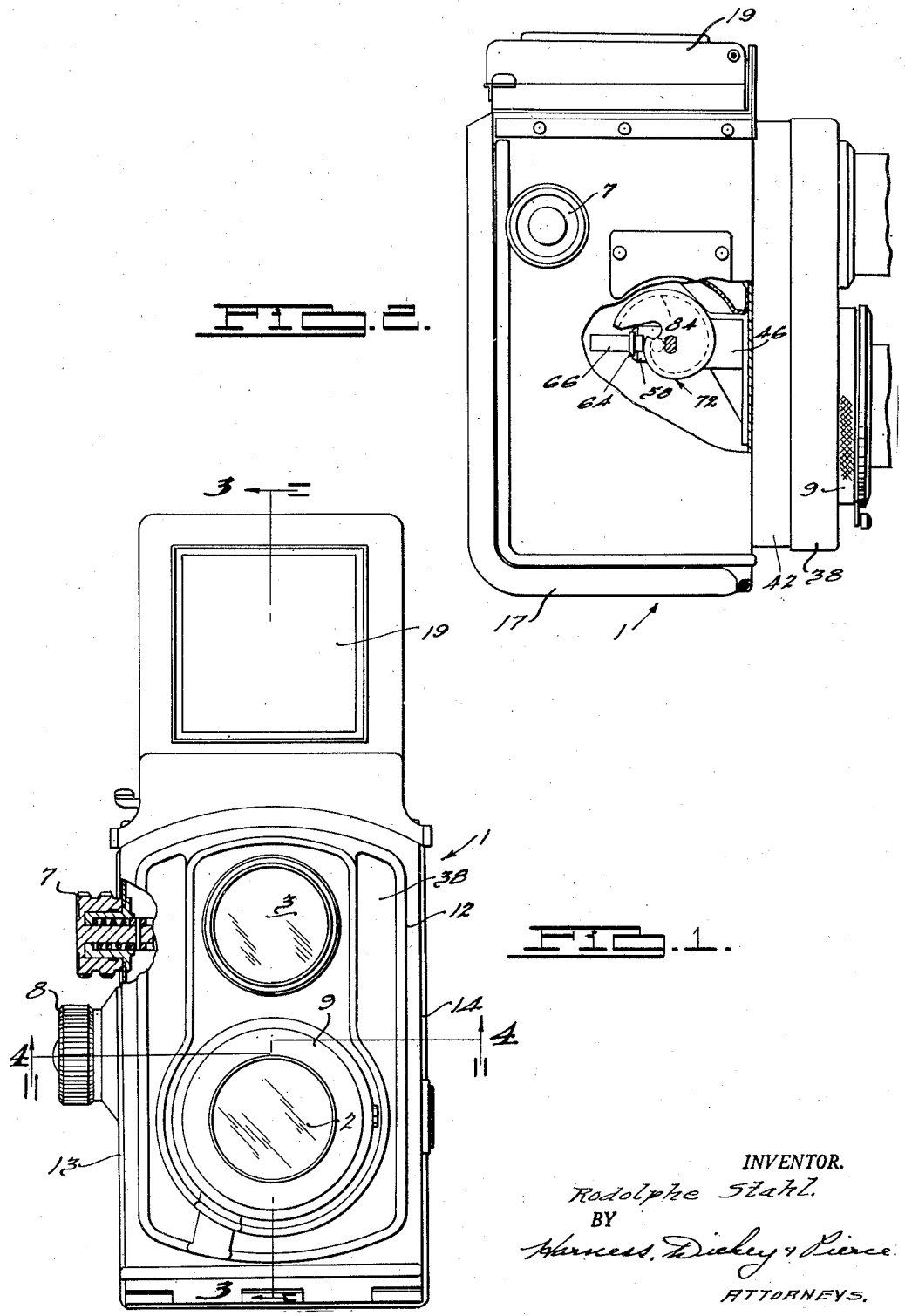
INVENTOR.
Rodolphe Stahl.
BY
Harness, Dickey & Pierce
ATTORNEYS.

Jan. 24, 1950   R. STAHL   2,495,355
FOCUSING MECHANISM FOR TWIN LENS REFLEX CAMERAS
Filed Aug. 30, 1946   2 Sheets-Sheet 2
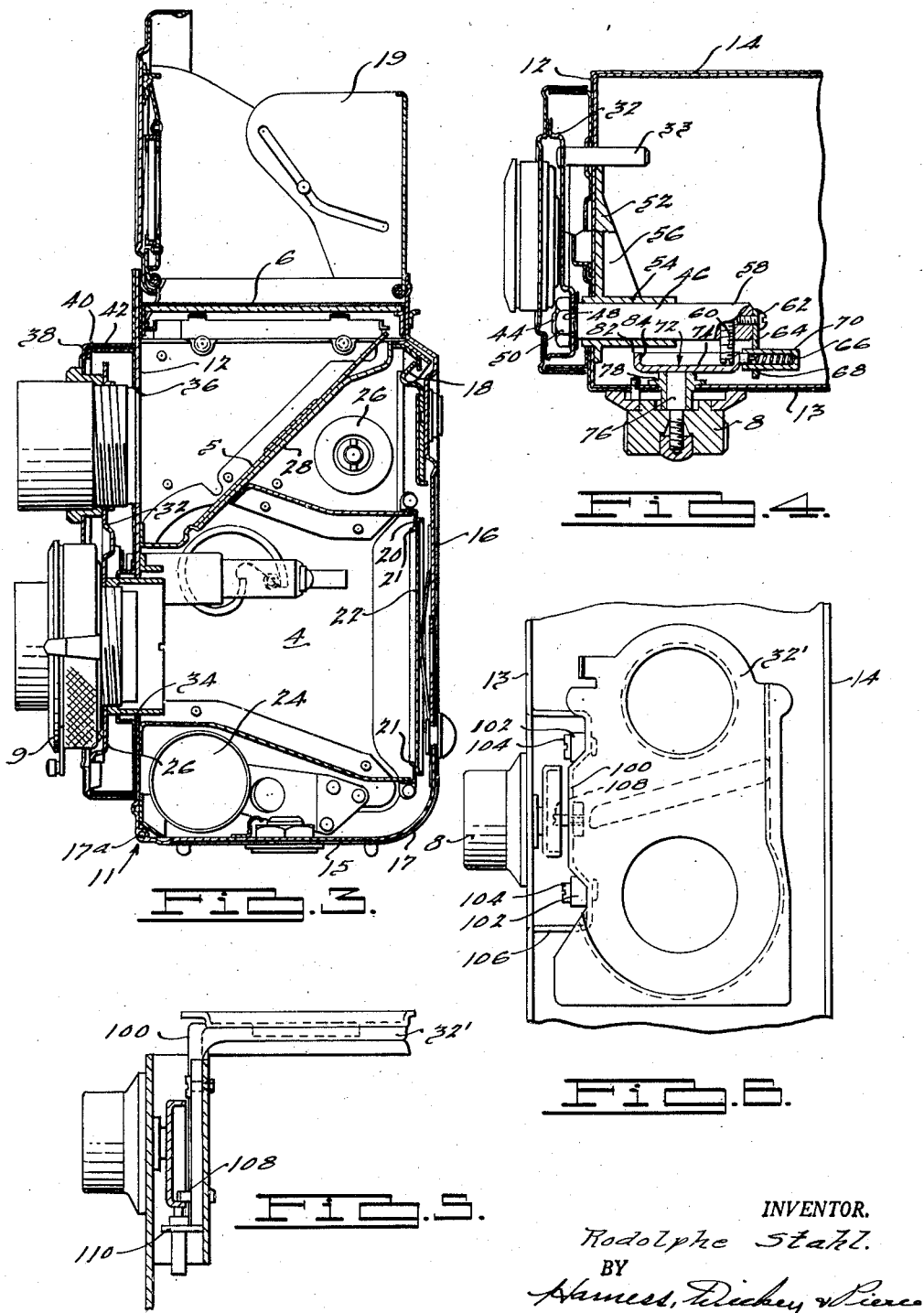
INVENTOR.
Rodolphe Stahl.
BY
Harness, Dickey & Pierce
ATTORNEYS.

Patented Jan. 24, 1950

2,495,355

UNITED STATES PATENT OFFICE 2,495,355

FOCUSING MECHANISM FOR TWIN LENS REFLEX CAMERAS

Rodolphe Stahl, Detroit, Mich., assignor to Ciro Cameras, Inc., Delaware, Ohio, a corporation of Michigan Application August 30, 1946, Serial No. 693,844

5 Claims. (Cl. 95—44)

The present invention relates to cameras and is particularly directed toward a simplified means for focusing.

The principal objects of the present invention are to provide a focusing mechanism of the aforesaid type which is simple to operate and easily and economically manufactured; to provide a movable lens-carrying structure which is supported by a single support; to provide a focusing mechanism which operates by a single cam; to provide such a single cam-adjusting mechanism which is free of any backlash; and generally to improve lens-adjusting structures of the type described.

With the above, as well as more detailed objects, in view, which appear in the following description and the appended claims, preferred but illustrative embodiments of the invention are shown in the accompanying drawings in which:

Fig. 1 is a view in front elevation of a camera embodying the invention;

Fig. 2 is a view in side elevation of the camera with parts broken away to illustrate more clearly the focusing mechanism;

Fig. 3 is a view taken substantially along the line 3—3 of Fig. 1;

Fig. 4 is a partial view taken substantially along the line 4—4 of Fig. 1;

Fig. 5 is a view similar to Fig. 4 showing a modified form of the invention;

Fig. 6 is a partial front view with certain of the parts removed, showing a modified form of the invention.

Referring to the drawings, the numeral 1 designates generally a reflex type camera having a film exposing lens 2, a focusing lens 3, a lighttight chamber 4 open to the film to be exposed, a reflecting mirror 5, a ground glass viewing screen 6, a film-winding knob 7, and a focusing knob 8. The lens 2 is carried within a shutter mechanism 9, which may be any of the usual types, which controls the light image admitted to the lighttight exposing chamber 4 of the housing 11 for the camera 1. The housing 11 comprises front and side walls 12, 13, and 14, which are preferably of welded sheet metal construction covered on the outside with a suitable fabric such as leather. The bottom wall 15 and rear wall 16 are formed from a single piece of metal to provide a cover member 17 and hinged as at 17a to the front wall 12. A latch mechanism 18 holds the walls 15 and 16 in lighttight closing relation to the walls 13 and 14. The viewing screen 6 forms the top wall of the casing and may be closed when not in use by a hinged viewing hood 19 which may have hinged thereto a magnifying lens for aiding in the focusing of the viewed image on the screen 6.

The rear wall 20 of the chamber 4 has an aperture 21 therethrough against which the film section to be exposed is held by a spring-pressed plane film supporting plate 22 carried by the rear wall 16. A supporting member 24 adapted to hold a roll of film of the desired size is located intermediate the chamber 4 and the bottom wall 15 so that it is easily accessible upon opening of the cover member 17 so that the film (not shown) may be easily inserted. The film (not shown) extends under the chamber 4 upward between the plate 22 and rear wall 20 in registry with the aperture 21 and is wound upon a second film spool (not shown) carried by the mechanism 26 located in front of the rear wall 16 above the chamber 4 and beneath a mirror support 28 for the mirror 5 which reflects the light image admitted thereto by the focusing lens 3 onto the viewing screen 6.

A lens-carrying plate member 32 is located forwardly of the front wall 12 for supporting the lenses 2 and 3 in registry with apertures 34 and 36 extending through the front wall 12 and opening into the chamber 4 and to the mirror 5 respectively. A cover plate 38 conceals from view the plate member 32 and has a peripheral rearwardly extending flange 40 which telescopes in lighttight relation with a forwardly extending flange 42 of the housing front wall 12 so that the lenses 2 and 3 may be moved toward and away from the housing 11 without light being admitted to the chamber 4 and mirror 5 except through the lenses 2 and 3 respectively. The edge portion of the plate member 32 adjacent the housing side wall 13 is apertured for receiving an externally threaded, reduced diameter end portion 44 of a cylindrical, rodlike member 46 having a shoulder 48 formed at the intersection of the portion 44 with the normal diameter portion of the member 46. A nut 50 rigidly holds the member 32 against the shoulder 48 and in a plane perpendicular to the longitudinal axis of the member 46. As illustrated, swinging or tilting of the lens plate 32 within the just-mentioned plane, or about the axis of post 46 is prevented by pilot pin 33 which is fixed to plate 32 and is slidably received in an aperture provided therefor in the front wall 12.

A supporting structure 52, suitably secured as by welding to the inner surface of the housing front wall 12, has a cylindrical sleeve portion 54 aligned with the member 46 and held rigid by a web 56. The member 46 extends through the bore of the sleeve portion 54 and has a tight sliding or piston fit therewith. The extending end portion 58 of the member 46 has a radially extending, screw-threaded aperture which is arranged to open toward the housing wall 13 and which receives a pin-like cam follower member 60. The end surface of the extending rod-like member 46 has a screw-threaded aperture for receiving a screw 62 which holds a plate-like finger member 64 which extends in spaced relation to the cam follower member 60. An open-ended cup-shaped housing 66 is carried by the finger member 64 with its open end portion facing the follower member 60 so that a spring-pressed pin 68 supported by the housing 66 is resiliently urged toward the follower member 60 by a spring 70 located within, and seating against the bottom wall of, the housing 66. The lens-carrying plate member 32 is held against rotational movement by a guide pin 71 carried adjacent the opposite edge portion of the member 32 from the member 46, which projects into an aperture in the front wall 12 and structure 52.

A cam member 72 comprises a formed sheet metal portion 74 supported on, and rotatable by, a hub 76 journaled in a bearing 78 carried by the camera housing wall 13. The hub 76 extends outwardly of the wall 13 and bearing 78 and has secured thereto the adjusting knob 8 by which the cam member 72 may be rotated. The sheet metal portion 74 has a peripheral flange 82 extending outwardly therefrom toward the rod-like member 46 which is received between the cam follower member 60 and pin 68. The inner surface of the flange 82 forms cam surface 84 of the member 72 while the outer surface thereof is slidably engaged by the pin 68 so that the spring 70 is operable to maintain the cam follower member 60 in engagement with the cam surface 84 at all times.

In the modified form, a flanged, plate-like supporting member 100 is formed integrally with and extends at substantially right angles to the plane of the lens plate member 32'. Wedge-shaped members 102, forming guides or ways for the member 100, are secured as by screws 104 to a U-shaped member 106 held rigid with the camera wall 13 as by welding. In this modification, a cam follower pin 108 is carried by the arm 100 and engages the cam surface 84 and the cup-shaped member 66 carrying the spring 70 and the resiliently urged pin 68 is carried by a flange 110 which is bent outwardly from the arm 100.

In prior art constructions of the general type described, two or more cams carried on opposite walls of the camera body have been used which by painstaking hand workmanship have been formed nearly identical. If these cams are not as nearly identical as possible the lens-carrying plate will not, as it is moved forwardly and backwardly, be maintained absolutely parallel to the plane of the film upon which the light image is being focused, which is necessary so that objects at varying distances may be clearly focused on the film or on the viewing screen. If the lens plate is guided by other means to maintain it in this parallel relationship and cams not exactly identical are used, the plate cannot be smoothly moved but will bind so that accurate focusing, if not impossible, is extremely difficult. With the construction described, a single cam is used which may be easily and cheaply manufactured by production methods within the necessary tolerances and may even be stamped from sheet metal. A single supporting structure, located as shown, wholly at one side of the case carries the lens plate for forward and backward movement and positively supports the lens plate in a plane perpendicular to the axes of the lenses 2 and 3. Thus, the difficult task of maintaining two guide posts and sleeves in absolute parallelism with no tight spots is also eliminated, together with the manufacturing costs for the operational procedure.

What is claimed and is desired to be secured by United States Letters Patent is:

1. In a focusing-type camera, a body, a movable lens plate associated with said body, and having means for carrying a picture-taking lens and a focusing lens, said lens plate being arranged for movement relative to said body whereby a viewable image admitted through said focusing lens may be brought into focus so that a corresponding image to be admitted through said picture-taking lens will be in focus for exposing a sensitized film, a single adjusting means located wholly on one side of the light paths of said lenses for effecting focusing movements of said lens plate relative to said body and constituting the sole means for effecting said movements, said adjusting means comprising a cylindrical post rigidly secured to said lens plate adjacent one edge portion thereof, said post extending outwardly from said lens plate toward said body, a supporting member rigidly secured to said body and having an internal cylindrical bearing surface which slidably receives and snugly fits said post, a single cam carried by said body and having a flange of substantially uniform thickness to provide a cam surface and a follower surface, said surfaces being movable relative to said supporting member, a cam follower carried by said post and engageable with said cam surface, means movable with said post and engageable with said follower surface for maintaining said follower in engagement with said cam surface under substantially constant pressure irrespective of the position of said cam member, and means preventing rotation of said post in said bearing surface.

2. In a focusing-type camera, a body, a movable lens plate associated with said body, and having means for carrying a picture-taking lens and a focusing lens, said lens plate being arranged for movement relative to said body whereby a viewable image admitted through said focusing lens may be brought into focus so that a corresponding image to be admitted through said picture-taking lens will be in focus for exposing a sensitized film, a single adjusting means located wholly on one side of the light paths of said lenses for effecting focusing movements of said lens plate relative to said body and constituting the sole means for effecting said movements, said adjusting means comprising a cylindrical post rigidly secured to said lens plate adjacent one edge portion thereof and intermediate the centers of said lenses, said post extending outwardly from said lens plate toward said body, a supporting member rigidly secured to said body and having an internal cylindrical bearing surface which slidably receives and snugly fits said post, a single platelike cam having a peripheral flange of substantially uniform thickness to provide a cam surface and a follower surface, means journaling said cam on said body, a cam follower carried by said post and engageable with said cam surface, means carried by said post and engageable with said follower surface for maintaining said follower in engagement with said cam surface under substantially constant pressure irrespective of the position of said cam member, and means preventing rotation of said lens plate about the longitudinal centerline of said bearing surface.

3. In a focusing-type camera, a body, a movable lens plate associated with said body, and having means for carrying a picture-taking lens and a focusing lens, said lens plate being arranged for movement relative to said body whereby a viewable image admitted through said focusing lens may be brought into focus so that a corresponding image to be admitted through said picture-taking lens will be in focus for exposing a sensitized film, a single adjusting means located wholly on one side of the light paths of said lenses for effecting focusing movements of said lens plate relative to said body and constituting the sole means for effecting said movements, said adjusting means comprising a cylindrical post rigidly secured to said lens plate adjacent one edge portion, said post extending outwardly from said lens plate toward said body, a supporting member rigidly secured to said body and having an internal cylindrical bearing surface which slidably receives and snugly fits said post, a single cam member carried by said body and having an outwardly extending rib of uniform thickness providing a cam surface and a second surface, means supporting said cam member for movement relative to said supporting member, a cam follower carried by said post and engageable with said cam surface, a resiliently urged abutment engageable with said second surface and carried with said post for maintaining said follower in engagement with said cam surface under substantially constant pressure irrespective of the position of said cam member, and means preventing rotation of said lens plate about said support.

4. In a focusing-type camera, a body part, a movable lens carrying member associated with said body part and having means for carrying a picture-taking lens and a focusing lens, said lens member being arranged for movement relative to said body part whereby a viewable image admitted through said focusing lens may be brought into focus so that a corresponding image admitted through said picture-taking lens will be in focus for exposing a sensitized film, a single adjusting means located wholly on one side of the light paths of said lenses for effecting focusing movements of said lens member relative to said body part and constituting the sole means for effecting said movements, said adjusting means comprising a cylindrical post member rigidly secured to said lens member adjacent one edge portion, a supporting part rigidly secured to said body part and having an internal cylindrical bearing surface which slidably receives and snugly fits said post member, said post member extending completely through said supporting part, a single rotatable cam element journaled on said body part and having an outturned flange of substantially uniform thickness providing a cam surface and a second surface substantially uniformly spaced from said cam surface, a radially extending cam follower pin carried by said post member on the opposite side of said supporting part from said lens member and engageable with said cam surface, an arm secured to the end surface of said post member on said opposite side, a resiliently urged abutment carried by said arm and engaged with said second surface for maintaining said follower in engagement with said cam surface under substantially constant pressure irrespective of the position of said cam element, and a means associated with one of said members and cooperable with one of said parts for holding said lens member against rotation relative to said body part.

5. A focusing mechanism for a reflex-type camera having a body and a lens plate adapted to be provided with a picture-taking lens and a focusing lens and adapted to be positioned wholly on one side of the light paths of said lenses, a single adjusting means adapted to constitute the sole means for effecting a focusing movement of said lenses comprising a single cylindrical post adapted to be rigidly secured to said lens plate and to extend outwardly therefrom toward said body, a supporting member adapted to be carried by said body and having an internal cylindrical bearing surface which slidably receives and snugly fits said post, a single cam member having a flange of substantially uniform thickness providing a cam surface and a second surface, said cam member being adapted to be supported for guided movement relative to said supporting member, a cam follower carried by said post and engageable with said cam surface, and a resiliently urged abutment engageable with said cam member second surface and carried by said post for maintaing said follower in engagement with said surface under substantially constant pressure irrespective of the position of said cam.

RODOLPHE STAHL.

REFERENCES CITED

The following references are of record in the file of this patent:

UNITED STATES PATENTS

| Number | Name | Date |
|---|---|---|
| 1,152,238 | Tessier | Aug. 31, 1915 |
| 1,187,136 | Gall | June 13, 1916 |
| 1,856,432 | Rudolph et al. | May 3, 1932 |
| 2,165,341 | Capstaff et al. | July 11, 1939 |
| 2,297,401 | Gabler et al. | Sept. 29, 1942 |
| 2,309,403 | Kosken et al. | Jan. 26, 1943 |
| 2,386,575 | Simmon et al. | Oct. 9, 1945 |

FOREIGN PATENTS

| Number | Country | Date |
|---|---|---|
| 778,677 | France | Jan. 2, 1935 |
| 643,094 | Germany | Mar. 24, 1937 |